United States Patent [19]

Sethi

[11] 4,194,822
[45] Mar. 25, 1980

[54] PHOTOGRAPHIC FILM CARTRIDGE ASSEMBLY AND CAMERA

[75] Inventor: Gurdip S. Sethi, Rochester, N.Y.

[73] Assignee: Eastman Kodak Company, Rochester, N.Y.

[21] Appl. No.: 931,053

[22] Filed: Aug. 4, 1978

[51] Int. Cl.² .................. G03B 17/32; G03B 19/10
[52] U.S. Cl. .................. 354/121; 354/275; 354/277
[58] Field of Search ............. 354/121, 275, 276–278, 354/281, 283, 284; 206/578, 316, 444, 626; 352/72, 102, 103

[56] References Cited

U.S. PATENT DOCUMENTS

| | | | |
|---|---|---|---|
| 1,410,029 | 3/1922 | Niell | 352/102 |
| 1,563,551 | 12/1925 | Bulask | 352/103 |
| 2,188,974 | 2/1940 | Dilks | 354/121 |
| 2,531,651 | 11/1950 | Tait et al. | 354/121 |
| 2,625,087 | 1/1953 | Steineck | 354/121 |

Primary Examiner—John Gonzales
Attorney, Agent, or Firm—M. S. Sales

[57] ABSTRACT

A film cartridge assembly is disclosed including a two-part casing with a film disk rotatably mounted therein. Individual image areas on the film disk are sequentially aligned with an exposure window in one casing part by rotation of the disk. An opaque cover member is mounted in the casing for reciprocating movement into and out of alignment with the exposure window to control admission of light to the film disk. Coupling means interconnect the film disk and the cover member to impart rotational movement to the film disk during and as a result of at least a portion of the movement of the cover member.

30 Claims, 11 Drawing Figures

PHOTOGRAPHIC FILM CARTRIDGE ASSEMBLY AND CAMERA

BACKGROUND OF THE INVENTION

1. Cross-Reference to Related Applications

Reference is hereby made to commonly-assigned copending U.S. patent application Ser. No. 774,716 entitled PHOTOGRAPHIC FILM UNIT AND CARTRIDGE ASSEMBLY filed in the name of Donald M. Harvey on Mar. 7, 1977.

2. Field of the Invention

The present invention relates to film cartridge assemblies for use with cameras and, more specifically, to a film cartridge assembly including a film disk rotatably mounted in a casing.

3. Description of the Prior Art

It has become commonplace in recent years to enclose photographic film in a cartridge, cassette, magazine or the like, designed to afford convenient loading of a camera. While, more typically, such enclosures have been configured to accommodate an elongated strip of photosensitive roll film, it is also known to provide a plurality of exposure areas in a generally circular array on a disk-shaped sheet of film and to rotate such sheet incrementally to bring successive exposure areas into alignment with the camera's optical axis for exposure. Typical advantages of such a film disk over roll film include the relative compactness of the film package and the relative flatness exhibited by the film.

An illustrative example of film disk arrangements includes that shown in U.S. patent application Ser. No. 774,716 entitled PHOTOGRAPHIC FILM UNIT AND CARTRIDGE ASSEMBLY filed on Mar. 4, 1977, in the name of Donald M. Harvey. A film disk is mounted on a central, toothed core to form a film unit adapted to be rotatably supported within a protective casing for insertion into a camera. The film disk has a plurality of image areas residing along a generally circular exposure region extending substantially around the core so that the disk may be rotated to bring individual image areas into alignment with an exposure window in the casing.

In the aforementioned patent application, the film unit includes a cover member having an opaque leaf portion which is rotatable with the film disk and core. When the cartridge is not in a camera, the leaf portion underlies the casing's exposure window to prevent light which enters through the window from fogging the film. The camera's film indexing mechanism engages the core teeth to rotate the film unit to sequentially index each image area into alignment with the exposure window. After the film disk has been rotated 360°, the cover member's leaf portion is again below the exposure window and the cartridge assembly can be removed from the camera.

While the cartridge assembly described in the Harvey application provides highly accurate indexing of the film unit, once the cartridge assembly has been placed in a camera and the film unit indexed to the first frame, the cartridge assembly cannot be removed from and then reinserted into the camera to expose the remaining frames without light fogging several frames, unless the operation is conducted under "dark" conditions. A cartridge assembly according to the present invention can be removed from a camera without risk of fogging any film frames.

Since the cover member of the Harvey application is rotationally fixed to the film disk, its leaf portion always covers one region of the disk, which region is, therefore, not available for exposure. A cover member which is rotatable independently of the film unit as in the present invention makes the entire film disk available to receive latent images.

The cartridge assembly of the Harvey application has provision for preventing inadvertent reuse of an exposed cartridge assembly. However, because the film unit's angular position after complete exposure is identical to its position before exposure, a complex locking system is required. In contrast, the present invention provides for less than 360° of rotation of the film disk between the time the cartridge assembly is loaded into a camera and when it is removed therefrom. Accordingly, a less complex mechanism may be provided for a final locking function.

SUMMARY OF THE INVENTION

In accordance with the present invention, a cartridge assembly includes (1) a casing having an exposure window, (2) a film disk rotatably mounted in the casing to align individual image areas of an exposure region with the exposure window, and (3) a cover member having an opaque region for movement independent of the film disk into and out of alignment with the exposure window to selectively inhibit light passing through the exposure window from reaching the film disk. Coupling means are provided for interconnecting the film disk and the cover member to impart rotational movement to the film disk during at least a portion of the movement of the cover member.

In a preferred embodiment of the present invention, the film disk is mounted on an inner core and the coupling means includes a ratchet mechanism between the cover member and the core so that movement of the cover member in one direction rotationally moves the core and disk in a forward direction. The cover member is operatively disconnected from the core when moving in the opposite direction. An antiback-up mechanism associated with the core further inhibits reverse rotational movement of the core when the cover member moves in said opposite direction.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which.

DESCRIPTION OF THE PREFERRED EMBODIMENT

Various terms such as "cartridge", "cassette" and "magazine" have been used to refer to film containers. Such a container, when loaded with film, is herein referred to as a "cartridge assembly". Because cartridges, cartridge assemblies, and photographic cameras for use therewith are well known, the present description is directed in particular to elements forming part of or cooperating more directly with cartridge assembly elements to which the present invention is specifically directed. Apparatus that is not specifically shown or described herein is understood to be selectable from apparatus shown in the art.

Figure 1:
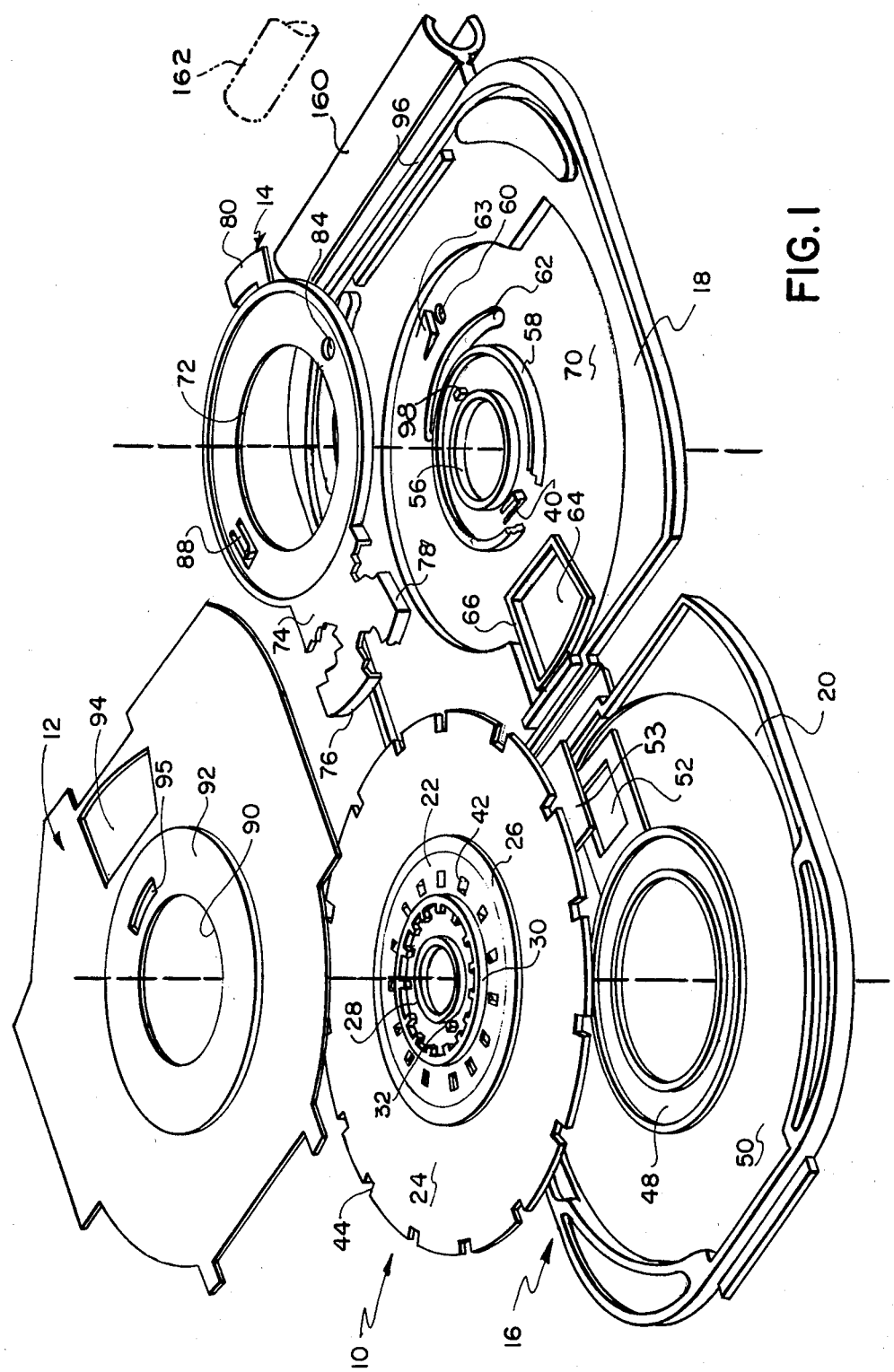
FIG. 1 is an exploded perspective view of an unassembled photographic cartridge assembly in accordance with the present invention.
Figure 2:
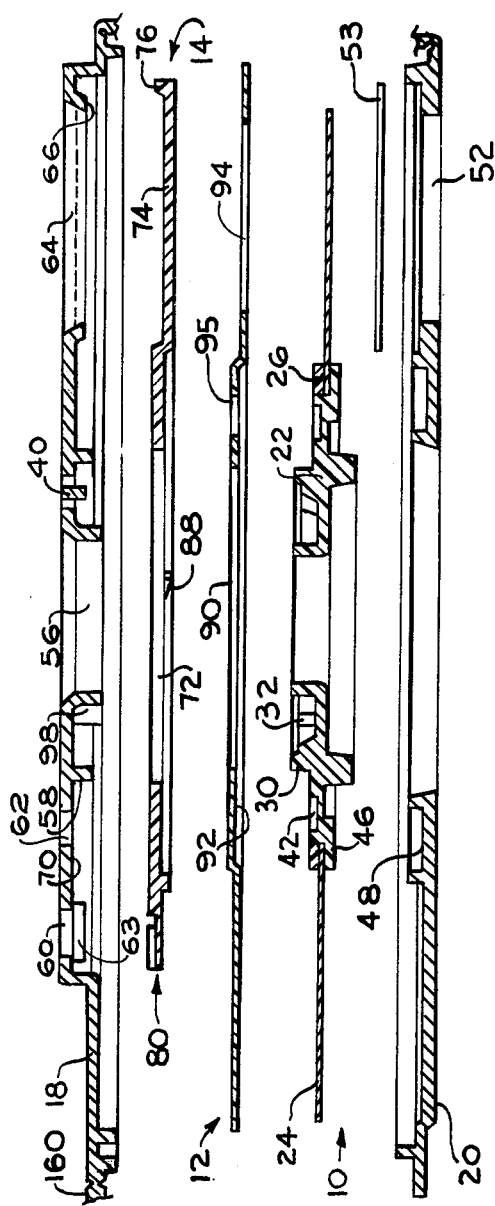
FIG. 2 is an exploded side elevational view, in section, of an assembled photographic cartridge in accordance with the present invention.

A cartridge assembly, shown in exploded perspective in FIG. 1 and in sectioned elevation in FIG. 2, includes a film unit assembly 10, a separator layer 12, a cover member 14, and a casing 16 with top and bottom parts 18 and 20, respectively. Terms like "top", "bottom", "above", "below", etc., are used herein with reference to the drawings for assisting the reader, and are not intended to necessarily refer to orientations during actual use of the apparatus described.

Figure 3:
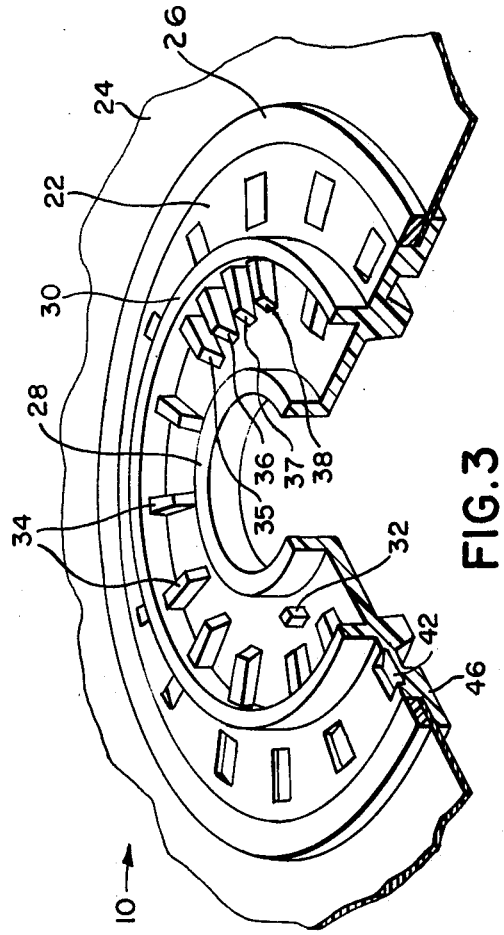
FIG. 3 is an enlarged perspective view partially broken away of the film unit assembly which is part of the cartridge assembly of FIGS. 1 and 2.

Film unit assembly 10, shown enlarged and in partial section in FIG. 3, includes a core 22 (also referred to as a hub), a film disk 24, and a mounting ring 26 which is bondable to core 22 to secure film disk 24. The film disk is illustrated as having a generally circular outer perimeter, but other non-circular (e.g., polygonal) film shapes such as hexagonal or octagonal may be visualized for use in accordance with the present invention. Accordingly, the term "disk" as here used is intended to include non-circular as well as the illustrated circular configuration.

Film disk 24 comprises a moderately flexible but self-support base sheet formed of, for example, cellulose acetate or poly(ethylene terephthalate), the latter being sold under the trademark "Mylar". The base sheet carries photosensitive elements on one face thereof, thus providing a photographic imaging surface on which a latent photographic image can be recorded and subsequently photographically developed.

Film disk 24 is arranged to record photographic images in a plurality of image areas which are spaced along a circular exposure region concentric with the film unit axis. In the preferred embodiment, the image areas are defined by surrounding borders which have been photographically pre-exposed. Such pre-exposure can be affected as part of the cartridge assembly manufacturing operation and, in combination with the indexing means described below, assures that the latent images generated on the film disk by exposure in the camera will lie in predetermined locations (i.e., the image areas) on the sheet.

Core 22 includes an inner raised ring 28, about a central opening, and an outer raised ring 30. A post 32 projects upwardly between the rings to form part of a "final locking" system to be explained in further detail hereinafter.

A plurality of widely spaced teeth 34 and closely spaced teeth 35-38 project radially inwardly from outer raised ring 30. These teeth cooperate with a ratchet pawl 40 (shown in FIG. 1 and detailed in FIG. 4) on casing top part 18 in a manner to be disclosed hereinafter to inhibit rotation of film unit assembly 10 in other than one desired direction. In the illustrated embodiment, the on-center spacing between teeth 35-38 is eight degrees, while the other spaces between teeth are twenty four degrees each.

A plurality of equally circumferentially spaced discontinuities in the form of recesses 42 are provided in core 22 radially outwardly of ring 30 for, in conjunction with other structure to be disclosed, indexing film unit assembly 10. The perimeter of film disk 24 is notched as at 44 for cooperation with camera structure disclosed hereinafter for film metering and locating purposes.

Annular projection 46 (FIG. 3) of core 22 rotatably rides in a groove 48 (FIG. 1) in casing bottom part 20. Film disk 24 projects radially outwardly from core 22 and lies in a circular recess 50. An opening 52 passes through bottom part 20 in the region of recess 50 and is covered by an opaque flexible membrane 53 to prevent light and dirt from entering the cartridge assembly through opening 52. The opening is provided so that a camera's pressure pad may exert pressure through the membrane to push film disk 24 against the camera's film locating structure.

Referring now to casing top part 18, an annular wall 56 extends around a central opening, and a second annular wall 58 is spaced radially outwardly from wall 56. The top part has several significant features, the function of which will be set forth hereinafter, but which briefly include aforementioned ratchet pawl 40, a pair of apertures 60 and 62, a tooth 63, an exposure window 64, an upstanding rib 66, and a recess 70.

Cover member 14 has a central opening 72 sized to receive annular wall 58 of casing top part 18 so that the cover member can rotate about the axis of the annular wall. The cover member is formed of suitably thin but relatively stiff opaque sheet material and includes a generally fan-shaped leaf portion 74 so sized as to cover the exposure window. The passage of light rays through exposure window 64 and onto photosensitive film disk 24 when the cartridge assembly is not protectively encased by a camera is precluded by means of leaf portion 74 and separator layer 12. A lip 76 extends over casing top part rib 66 to form a light baffel, while a lip 78 extends over the edge of recess 70 to also form a light baffel and to define, with the recess edges, the limits of rotation of cover member 14.

Figure 5:
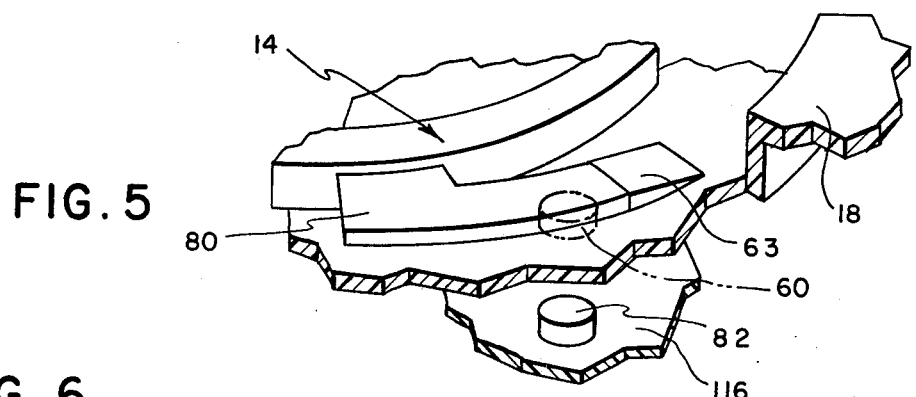
Figure 6:
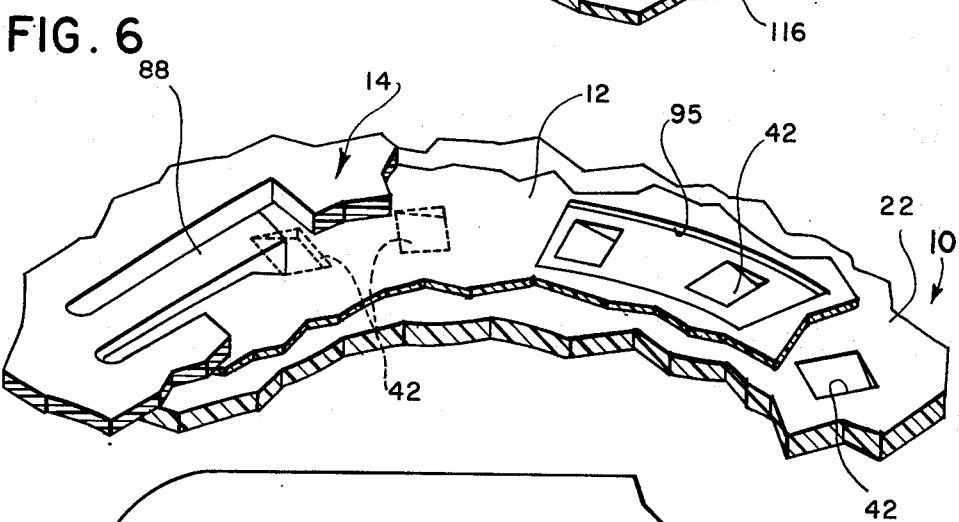

A locking mechanism for preventing inadvertent rotation of the cover member before the cartridge assembly is loaded into a camera includes a tab 80 (detailed in FIG. 5) on the cover member. The tab is aligned with aperture 60 and engages tooth 63 of the casing top part when leaf portion 74 is aligned with exposure window 64. Tab 80 is depressed by a camera pin 82 to disable the locking mechanism when the cartridge assembly is received in a camera. Another discontinuity, illustrated as a hole 84, in cover member 14 is aligned with aperture 62 and engageable by a camera pin 86 for rotating the cover member. Finally, a ratchet pawl 88 (detailed in FIG. 6) extends from the cover member toward core 22 and is aligned radially with recesses 42 on the core. As will be explained, pawl 88 cooperates with the recesses to intermittently rotate film unit 10 when cover member 14 is rotated in first one and then the other directions about annular wall 58.

Separator layer 12 is formed of an opaque sheet material and has a central aperture 90 sized to admit outer ring 30 of core 22 and to conform to the inside diameter of annular wall 58 of the casing top part. A recess 92 in the separator layer receives the core and mounting ring 26, and a framing window 94 is aligned with exposure window 64. An aperture 95 is radially aligned with notches 42 on core 22.

Figure 4:
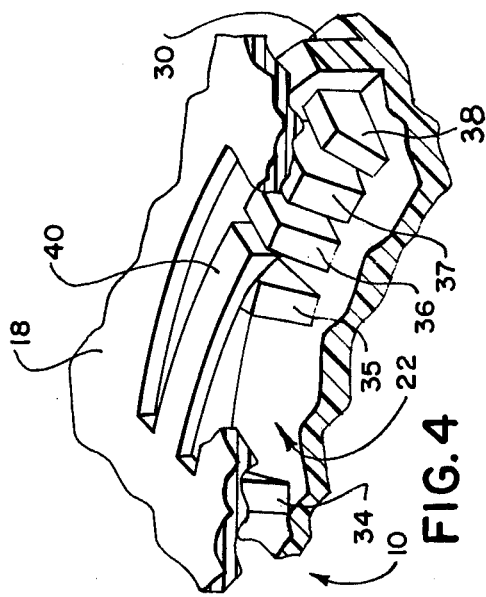
FIGS. 4–6 are enlarged views of details of the photographic cartridge assembly of FIGS. 1 and 2.

Before the cartridge assembly is loaded into a camera, cover member 14 is held against rotation in one direction in casing assembly 16 by engagement of lip 78 and the edge of recess 70, and in the other direction by tab 80 engaging tooth 63. Rotation of film unit assembly 10 in casing assembly 16 is inhibited by pawl 40 on casing top part 18 lying between closely spaced teeth 35 and 36 as shown in FIG. 4 such that engagement between the pawl and tooth 36 prevents counterclockwise rotation of the film unit assembly as viewed in that figure.

Figure 7:
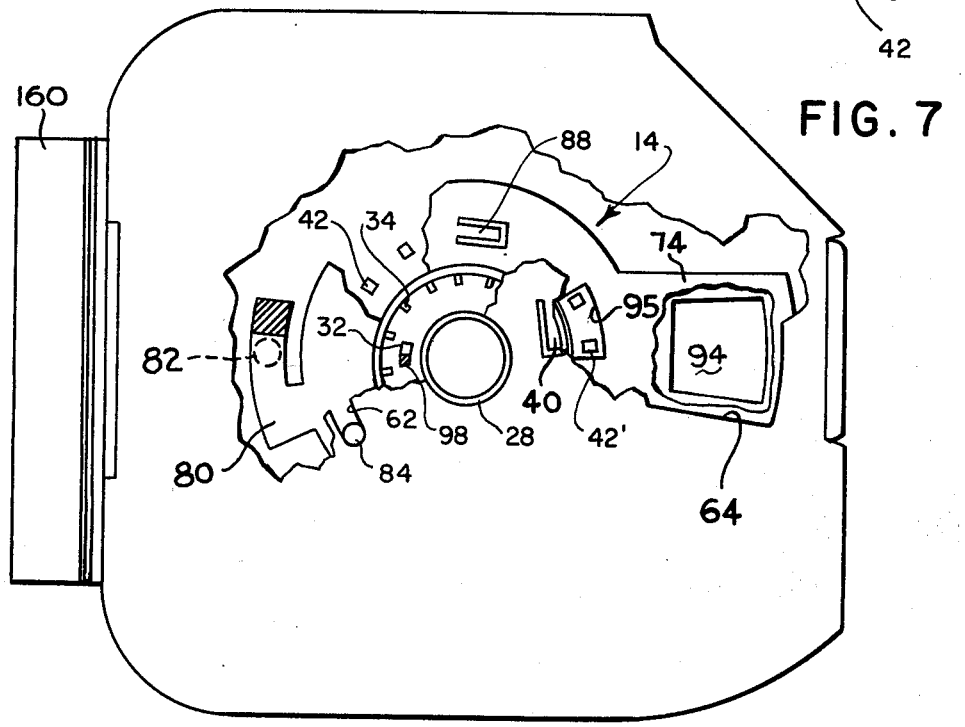
FIG. 7 is a top plan view partially broken away of the photographic cartridge assembly of FIGS. 1 and 2.
Figure 8:
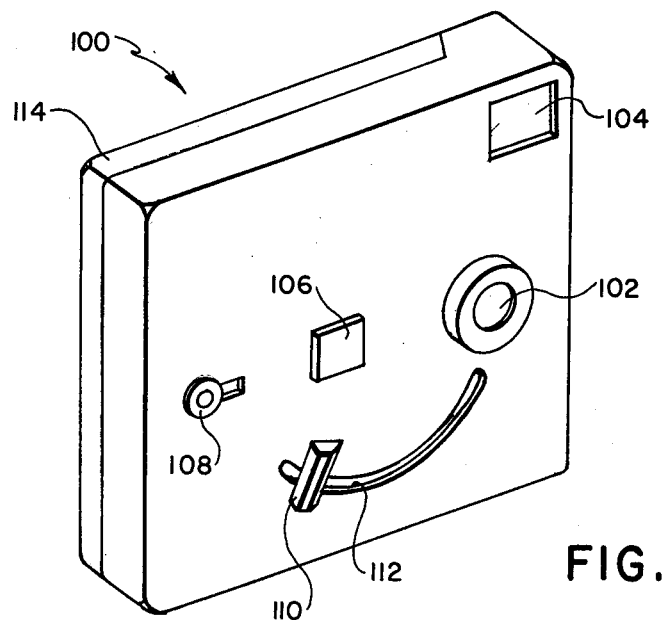
FIG. 8 is a front perspective view of a camera for use with the cartridge assembly of FIGS. 1 and 2.

As shown in FIG. 7, leaf portion 74 of cover member 14 is in light blocking relationship with exposure window 64 and separator layer window 94. Inasmuch as leaf portion 74 is larger than the aligned windows 64 and 94 between which it is interposed, a labyrinth light baffling arrangement is created to restrict the access of actinic light rays to film disk 24 through the windows.

Figure 9:
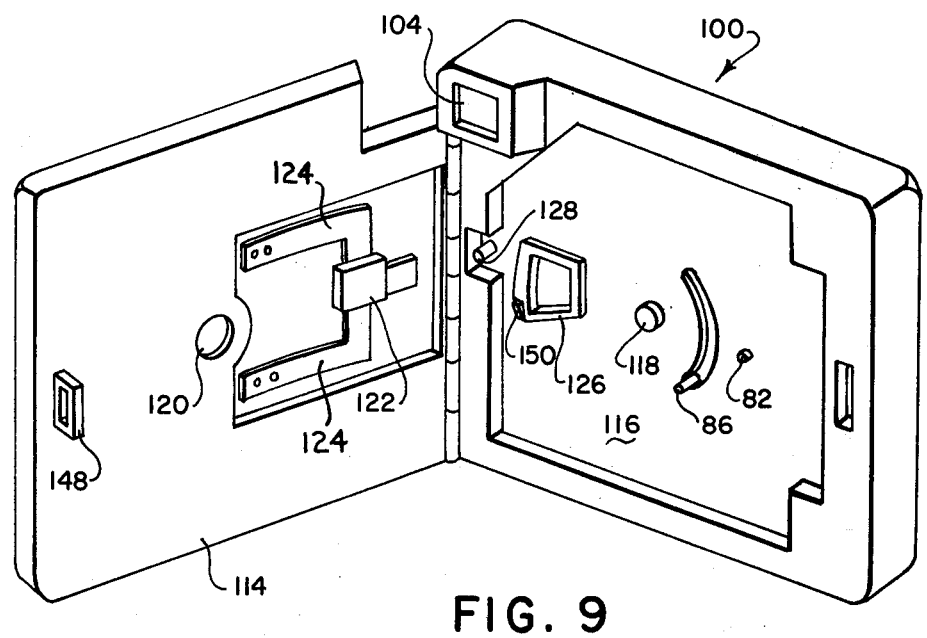
FIG. 9 is a back perspective view of the camera of FIG. 8 with the door open to show the cartridge-receiving chamber.

The cartridge assembly is adapted to be received in a camera such as shown schematically in FIGS. 8–11 and referred to by numeral 100. The camera front (FIG. 8) has a taking lens 102, view finder 104, a shutter release button 106, a door opening tab 108, and a manually accessible film advance member 110 which extends through an arcuate slot 112 in the camera front. Referring to FIG. 9, the rear of the camera is shown with its door 114 open to show a cartridge chamber 116. The chamber is sized and asymmetrically shaped to receive the cartridge assembly and to assure that the cartridge assembly can be inserted in only a single, predetermined orientation.

A stationary post 118 extends into chamber 116 to pass through the center hole in the core of a received cartridge assembly. Post 118 projects into a recess 120 in door 114. When the cartridge assembly is inserted in chamber 116 and the door closed, a rectangular pressure plate or platen 122 attached to door 114 by a pair of resilient spring arms 124 enters opening 52 to urge film disk 10 toward a film support frame 126. During film indexing, to be explained hereinafter, the pressure of platen 122 against the film disk is at least partially relieved by a pin 128 so that the film disk is free to rotate in casing 16. The mechanism for moving pin 128 is shown and described in the aforementioned Harvey application.

Figure 10:
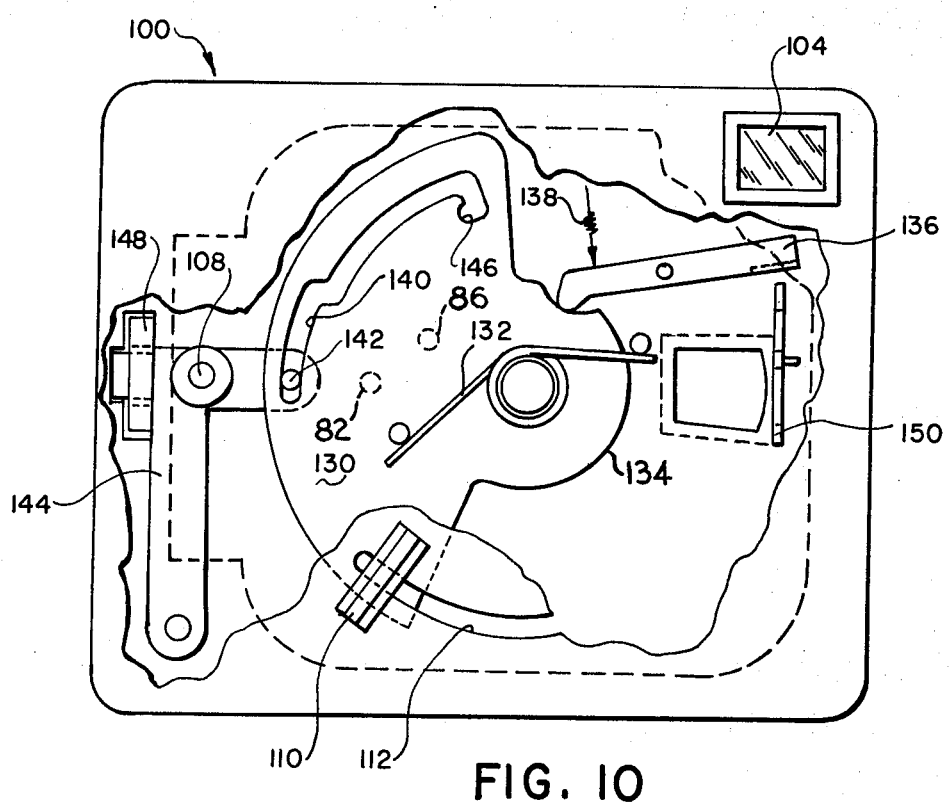
FIG. 10 is a fragmentary front view of the camera of FIGS. 8 and 9 showing details of its film disk indexing mechanism.

A pin 86, which was shown in FIG. 1, as well as FIGS. 9 and 10, is mounted on a rotatable sector 130 and adapted to enter hole 84 through slot 62 in cartridge casing top part 18. Sector 130 is biased by a spring 132 to rotate in a clockwise direction as viewed in FIG. 10. The sector has a cam surface 134 against which a follower lever 136 is held by a spring 138. A slot 140 in sector 130 slidably receives a pin 142 on a pivoted door latch lever 144. Film advance member 110 is attached to sector 130 for movement therewith.

When door 114 of the camera is open, sector 130 is rotated from its FIG. 10 position, and pin 142 is trapped in a region 146 of slot 140. Door latch lever 144 is rotated from its illustrated position to clear a latch plate 148 on door 114. Film advance member 110 is positioned at the other end of slot 112 from that shown in FIGS. 8 and 10, and pin 86 is positioned as shown in FIG. 9.

Upon insertion of a cartridge assembly into camera 100, camera pin 82 enters hole 60 in casing top part 18 and depresses tab 80. This frees cover member 14 for one-way rotation. Simultaneously camera pin 86 enters hole 84 in the cover member through slot 62 in casing part 18. After camera door 114 is closed, the operator manually moves tab 108 to move door latch lever 144 into the hole in latch plate 148 and to withdraw pin 142 from region 146 of slot 140. Thereupon, spring 132 rotates sector 130 clockwise toward its FIG. 10 position.

As sector 130 rotates, it is accompanied by cover member 14. Leaf portion 74 is removed from alignment with both exposure window 64 and separator layer window 94 so that scene light may be imaged by a camera lens 102 upon film disk 24 when the camera's shutter (not shown) is opened.

During the initial part of its travel from its FIG. 7 position, pawl 88 slides across the surface of separator layer 12. After camera sector 130 has passed its position in which pin 142 is at the discontinuity of slot 140, pawl 88 reaches separator layer aperture 95 and falls against core 22 in radial alignment with recesses 42. When camera sector 130 has slightly more than eight degrees of rotation remaining to reach its FIG. 10 position, pawl 88 reaches and falls into the recess 42' aligned with aperture 95. Continued rotation of sector 130 rotates film unit 10 within casing 16. As the sector approaches its FIG. 10 position, a notch 44 on the periphery of disk 24 comes into alignment with a metering pawl 150 in film support frame 126. When the metering pawl enters a notch 44, film unit 10 continues to rotate until the trailing edge of the notch engages and is urged against the pawl to stop further film disk rotation.

Once pawl 150 is in a notch 44, the camera's exposure mechanism can be activated to expose the image area of disk 24 aligned with window 64 (e.g., to produce a latent image on the image area). After a frame is exposed, the camera film indexing mechanism can be actuated to rotate film disk 24 to align the next succeeding image area with exposure window 64. When the operator is ready to index the film disk, member 110 (and, therefore, sector 130) is manually moved from its FIG. 10 position until pin 142 reaches the discontinuity of slot 140, inhibiting further rotation of sector 130 in that direction.

Figure 11:
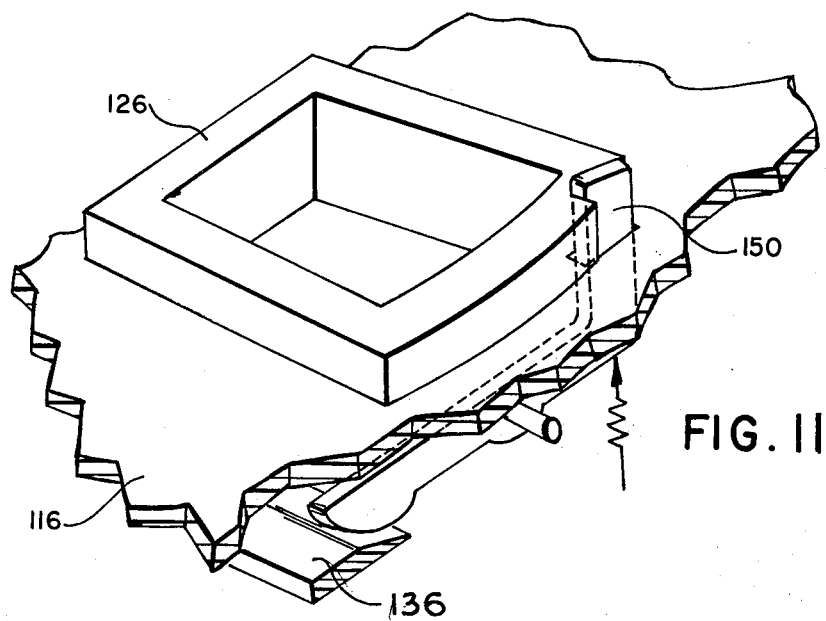
FIG. 11 is a view of a portion of the camera of FIGS. 8 and 9 showing details of the film support surface and metering mechanism.

As sector 130 rotates from its FIG. 10 position, one end of follower lever 136 rides up cam surface 134. The other end of lever 136 cams pawl 150 from notch 44 of the film disk, as shown in FIGS. 10 and 11. Also, as sector 130 moves from its FIG. 10 position, it is accompanied by cover member 14, pawl 88 moving out of both recess 42' and aperture 95 to again ride on separator layer 12. Any tendency for film unit 10 to rotate with cover member 14 because of friction is opposed by ratchet pawl 40 in engagement with tooth 35. When member 110 is released by the operator, sector 130 is rotated toward its FIG. 10 position by spring 132. Cover member 14 moves with the sector, and pawl 88 picks up the next succeeding recess 42 which is spaced twenty four degrees from the first recess 42' and which came into alignment with aperture 95 during the preceding film indexing operation. After dropping into that recess 42, pawl 88 advances film unit 10 until the second image area is aligned with exposure window 64 and metering pin 150 falls into another notch 44. Now the cartridge assembly is ready for the second exposure.

The above-described procedure is repeated with each exposure until fifteen pictures have been taken. After any one of the exposures, the operator may desire to remove the cartridge assembly temporarily from the camera to load the camera with a cartridge containing a different type of film (i.e., slide vs. print film, color vs. black and white, or one A.S.A. value vs. another). To remove the cartridge without fogging the film disk, the operator begins rotating member 110 from its FIGS. 8 and 10 position in a counterclockwise direction until pin 142 is at the discontinuity in slot 140. To continue rotating member 110 beyond that position, the operator must push tab 108 toward the center of the camera. Now, further rotation of member 110 rotates cover member 14 to its position wherein leaf portion 74 blocks exposure aperture 64.

When sector 130 has rotated to a position to align pin 142 with the end of slot 140, tab 108 may be pushed further so that pin 142 enters region 146 of the slot and door latch lever 144 clears latch plate 148. Only then can door 114 be opened. The cartridge assembly may now be removed from the camera, whereupon tab 80 abuts tooth 63 on casing top part 18 to inhibit inadvertent rotation of cover member 14 while the cartridge assembly is out of the camera.

Upon reloading the cartridge assembly into the camera, closing door 114 and moving tab 108 outwardly, sector 130 returns to its FIG. 10 position, indexing the film unit and moving leaf portion 74 out of alignment with exposure window 64. The cartridge assembly is now conditioned for exposure of the next image area.

When the last, fifteenth image area is exposed, ratchet pawl 40 is between teeth 37 and 38. Now the operator once more rotates member 110 from its FIG. 10 position and releases it so that spring 132 can advance film. However, after film unit 10 has rotated only eight degrees, post 32 abuts against post 98 on casing top part 18 to inhibit further film movement. Now, ratchet pawl 40 is between teeth 36 and 37 to lock the film unit against rotation in one direction while posts 32 and 98 finally lock the film unit against rotation in the opposite direction.

From the time that the cartridge assembly was first loaded into the camera to this finally locked condition, film unit 10 has been rotated through an angle of three hundred fifty two degrees, and is eight degrees from its initial position. The angles of rotation of eight degrees of rotation from the film unit's initial position to the first image area, twenty four degrees between image areas, eight degrees final rotation, and eight degrees between the final and the initial positions are chosen to accommodate fifteen exposures on the disk and to ensure that the final position is different than the initial position. Of course, other angles may be chosen to permit more or less images on a film disk. To adapt a cartridge assembly for more or less exposures than that disclosed (fifteen), one would adjust the spacing between notches 44, recesses 42, and teeth 34-38. The dimension of aperture 95 would also have to be changed, all within the capabilities of those having ordinary skill in the art.

The film cartridge assembly has been shown in the drawings with a molded battery clip 160 for receiving a cylindrical battery 162 shown in broken lines in FIG. 1. The battery may be inserted in the clip just before packaging the cartridge assembly to maximize shelf life, and is used to power various camera mechanism such as, for example, electronic exposure control and flash mechanisms. The clip is provided with a notched fracture line so that the user may disconnect the clip and battery from the cartridge casing before sending to the processor, or so that the processor may disconnect the clip before opening the casing. Other forms of battery clips will readily occur to those skilled in the art. For example, the clip may be provided with snap-on features and/or be shaped to receive rectangular or other shaped batteries.

The invention has been described in detail with particular reference to preferred embodiments thereof, but it will be understood that variations and modifications can be effected within the spirit and scope of the invention.

I claim:

1. In a photographic cartridge assembly of the type having (1) an opaque casing, a wall of which has an exposure window and (2) a film unit, with a photographic film disk having an exposure region, mounted in the casing for rotational movement relative to the casing such that different image areas on the exposure region are moved successively into alignment with the exposure window; the improvement comprising:
   a cover member including an opaque region, said cover member being mounted in the casing between the wall and the film disk for movement, independent of the film unit, between a closing position in which said opaque region is aligned with and closes the exposure window, and an opening position in which said opaque region is out of alignment with and opens the exposure window; and
   means operatively interconnecting said film unit and said cover member for imparting rotational movement to the film unit during and as a result of at least a portion of the movement of said cover member to bring successive image areas into alignment with the exposure window.

2. The improvement as defined in claim 1 wherein:
   the casing further includes means for mounting said cover member for rotational movement; and
   the closing and opening positions of said cover member are angularly related.

3. The improvement as defined in claim 1 wherein said interconnecting means comprises:
   a ratchet pawl on one of the film unit and said cover member; and
   a plurality of discontinuities on the other of the film unit and said cover member cooperative with said pawl to provide one-way rotational movement of the film unit upon movement of said cover member.

4. The improvement as defined in claim 3 wherein said discontinuities correspond in number to the number of image areas to be aligned with the exposure window.

5. The improvement as defined in claim 3 wherein said interconnecting means is adapted to impart rotational movement to the film unit in a predetermined direction, and further comprising antiback-up means for inhibiting rotational movement of the film unit in a direction opposite to said predetermined direction.

6. The improvement as defined in claim 1 wherein:
   the film unit further includes a rigid core member to which the film disk is attached; and said interconnecting means includes means for selectively connecting said cover member and said core member.

7. The improvement as defined in claim 1 wherein:
the film unit further includes a rigid core member to which said film disk is attached; and
said interconnecting means includes (1) a ratchet pawl on one of said core member and said cover member, and (2) a plurality of discontinuities on the other of said core member and said cover member cooperative with said pawl to provide one-way rotational movement of the film unit upon movement of said cover member.

8. The improvement as defined in claim 7 wherein said discontinuities correspond in number to the number of image areas to be aligned with the exposure window.

9. The improvement as defined in claim 7 wherein said interconnecting means is adapted to impart rotational movement to the film unit in a predetermined direction, and further comprising means on said core member and the casing for inhibiting rotational movement of the film unit in a direction opposite to said predetermined direction.

10. The improvement as defined in claim 7 further comprising means for inhibiting connection of said ratchet pawl with said discontinuities during a portion of the movement of said cover member.

11. The improvement as defined in claim 7 further comprising a separator layer mounted in the casing between said cover member and the film unit for inhibiting connection of said ratchet pawl with said discontinuities during a portion of the movement of said cover member.

12. The improvement as defined in claim 11 wherein said separator layer has an aperture through which said ratchet pawl engages said discontinuities.

13. In a photographic cartridge assembly of the type having (1) an opaque casing, a wall of which has an exposure window and (2) a film unit, with a photographic film disk having an exposure region, mounted in the casing for rotational movement relative to the casing such that different image areas on the exposure region are moved successively into alignment with the exposure window; the improvement comprising:
a cover member including an opaque region, said cover member being mounted in the casing between the wall and the film disk for movement between (1) a closing position in which said opaque region overlays and closes the exposure window and (2) first and second spaced apart opening positions at which said opaque region is out of alignment with and opens the exposure window; and
means operatively interconnecting said film unit and said cover member for imparting rotational movement to the film unit during and as a result of at least a portion of the movement of said cover member only between its first and second opening positions to bring successive image areas into alignment with the exposure window.

14. The improvement as defined in claim 13 wherein said interconnecting means is ineffective to impart rotational movement to said film unit during movement of said cover member from its opening positions to its closing position.

15. The improvement as defined in claim 13 wherein:
the casing further includes means for mounting said cover member for rotational movement; and
the closing and opening positions of said cover member are angularly related.

16. The improvement as defined in claim 13 wherein said interconnecting means comprises:
a ratchet pawl on one of the film unit and said cover member; and
a plurality of discontinuities on the other of the film unit and said cover member cooperative with said pawl to provide one-way rotational movement of the film unit upon movement of said cover member.

17. The improvement as defined in claim 13 wherein said interconnecting means includes (1) a ratchet pawl on one of the film unit and said cover member and (2) a plurality of discontinuities on the other of the film unit and said cover member cooperative with said pawl to provide one-way rotational movement of the film unit upon movement of said cover member, said assembly further comprising a separator layer mounted in the casing between said cover member and the film unit for inhibiting cooperation of said ratchet pawl with said discontinuities during a portion of the movement of said cover member between its first and second opening positions.

18. The improvement as defined in claim 17 wherein said separator layer is positioned to inhibit cooperation of said ratchet pawl with said discontinuities during movement of said cover member between its closing and opening positions.

19. The improvement as defined in claim 13 wherein said interconnecting means is adapted to impart rotational movement to the film unit in a predetermined direction, and further comprising antiback-up means for inhibiting rotational movement of the film unit in a direction opposite to said predetermined direction.

20. In a photographic cartridge assembly of the type having (1) an opaque casing, a wall of which has an exposure window and (2) a film unit, with a photographic film disk having an exposure region, mounted in the casing for rotational movement relative to the casing such that different image areas on the exposure region are moved successively into alignment with the exposure window; the improvement comprising:
a cover member including an opaque region, said cover member being mounted in the casing between the wall and the film disk for movement in a predetermined direction from a closing position, in which said opaque region is aligned with and closes the exposure window, and an opening position in which said opaque region is out of alignment with and opens the exposure window; and
light seal means on the casing and said cover member, cooperable when said cover member is in its closing position, for inhibiting light entering the casing through the exposure window from reaching the film disk, said light seal means including an abutment surface on each of the wall and said cover member for (1) inhibiting movement of said cover member beyond its closing position in a direction opposite said predetermined direction and (2) forming a light baffel whereby light entering the casing through the exposure is inhibited by a tortuous path around said opaque region between said abutment surfaces from reaching the film disk.

21. The improvement as defined in claim 20 wherein:
the casing further includes means for mounting said cover member for rotational movement; and the closing and opening positions of said cover member are angularly related.

22. In a photographic cartridge assembly which is (1) receivable within a camera having a film drive mechanism and is (2) of the type having
(a) a film unit including a photographic film disk having an exposure region, and
(b) a protective casing including:
(1) an opaque wall having an exposure window, and
(2) means for mounting the film unit in the casing for rotational movement relative to the casing such that different image areas of the exposure region align with the exposure window;
the improvement comprising:
(a) an opaque cover member mounted in the casing for movement, independent of the film unit, between a closing position aligned with and closing the exposure window and an opening position out of alignment with and opening the exposure window, said cover member including means cooperable with the camera's film drive mechanism for moving the cover member;
(b) means operatively interconnecting the film unit and said cover member for imparting rotational movement to the film unit during and as a result of at least a portion of the movement of said cover member to bring successive image areas into alignment with the exposure window.

23. The improvement as defined in claim 22 wherein said interconnecting means comprises:
(a) a ratchet pawl on one of the film unit and said cover member; and
(b) a plurality of discontinuities on the other of the film unit and said cover member.

24. The improvement as defined in claim 23 wherein said interconnecting means is adapted to impart rotational movement in a predetermined direction to the film unit, and further comprising antiback-up means for inhibiting rotational movement of the film unit in a direction opposite to said predetermined direction.

25. The improvement as defined in claim 22 further comprising:
initial locking means partially on said cover member and partially on the casing for inhibiting movement of said cover member from its closing position prior to said cartridge assembly being received within the camera; and
means cooperable with the camera for releasing said locking means in response to said cartridge assembly being received in the camera.

26. The improvement as defined in claim 22 further comprising final locking means for inhibiting rotational movement of the film unit in either direction subsequent to rotational movement of the film unit through a predetermined arc.

27. The improvement as defined in claim 26 wherein said predetermined arc is less than 360 degrees.

28. The improvement as defined in claim 26 wherein said predetermined arc is approximately 352 degrees.

29. In a camera having a housing structure adapted to receive and position a photographic cartridge assembly of the type having (1) a casing with an exposure window, (2) a film unit mounted in the casing for rotational movement relative to the casing to bring successive exposure areas of the film unit into alignment with the window, (3) a cover member reciprocatively movable between a first position aligned with and closing the window and second and third positions out of alignment with and opening the window, and (4) unidirectionally operable means coupling the cover member and the film unit for translating reciprocation movement of the cover member into unidirectional movement of the film unit; the improvement comprising drive means engageable with the cover member of a received cartridge assembly for moving the cover member, said drive means having a first mode of operation for opening and closing the window by moving the cover member selectively between the first position and the second position, and a second mode of operation for incrementally rotating the film unit by reciprocating the cover member between the second position and the third position.

30. The invention defined in claim 29 in which the cartridge assembly receivable by said camera includes releasable locking means for locking the cover member in its first position, said camera further including lock releasing means for releasing said locking means when the cartridge is received in the housing structure.

* * * * *